United States Patent
Lin

(10) Patent No.: US 9,237,577 B2
(45) Date of Patent: Jan. 12, 2016

(54) METHOD, BASE STATION, AND RADIO COMMUNICATION SYSTEM FOR REDUCING INTER-CELL SIGNAL INTERFERENCE

(71) Applicant: Huawei Technologies Co., Ltd., Shenzhen, Guangdong (CN)

(72) Inventor: Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/205,809

(22) Filed: Mar. 12, 2014

(65) Prior Publication Data

US 2014/0220985 A1 Aug. 7, 2014

Related U.S. Application Data

(63) Continuation of application No. PCT/CN2012/081417, filed on Sep. 14, 2012.

(30) Foreign Application Priority Data

Sep. 14, 2011 (CN) .......................... 2011 1 0271809

(51) Int. Cl.
*H04W 36/00* (2009.01)
*H04W 72/08* (2009.01)
(Continued)

(52) U.S. Cl.
CPC ............ *H04W 72/082* (2013.01); *H04W 36/20* (2013.01); *H04W 72/0426* (2013.01)

(58) Field of Classification Search
CPC .......... H04W 72/082; H04W 72/0426; H04W 36/20
USPC ...................... 455/436–444, 450, 451, 452.1; 370/329, 331
See application file for complete search history.

(56) References Cited

U.S. PATENT DOCUMENTS 8,767,648 B2 * 7/2014 Gao et al. ...................... 370/329
2010/0238885 A1 9/2010 Borran et al.
(Continued)

FOREIGN PATENT DOCUMENTS

CN 101541088 A 9/2009
CN 101686550 A 3/2010
(Continued)

OTHER PUBLICATIONS

"Handling of Resource Restriction Patterns at Handover", 3GPP TSG-RAN WG2 Meeting #73bis, Huawei, HiSilicon, Apr. 11-15, 2011, 2 pages.
(Continued)

*Primary Examiner* — Wayne Cai

(57) ABSTRACT

The present invention relates to a method, a base station, and a radio communication system for reducing inter-cell signal interference. The method for reducing inter-cell signal interference includes: sending, by a serving base station, a user identity of a served user equipment to an neighboring second base station, coordinating a radio resource with the second base station, and obtaining a coordinated radio resource for scheduling the user equipment corresponding to the user identity, so that a base station that is neighboring to a base station using the coordinated radio resource to schedule the user equipment corresponding to the user identity avoids using the coordinated radio resource; and using, by the serving base station, the coordinated radio resource to schedule the user equipment corresponding to the user identity.

46 Claims, 5 Drawing Sheets

(51) Int. Cl.
*H04W 36/20* (2009.01)
*H04W 72/04* (2009.01)

(56) References Cited

U.S. PATENT DOCUMENTS

| | | | |
|---|---|---|---|
| 2010/0255854 A1 | 10/2010 | Lee et al. | |
| 2011/0053596 A1* | 3/2011 | Wohlert et al. | 455/436 |
| 2011/0312328 A1* | 12/2011 | Choi et al. | 455/450 |
| 2012/0113862 A1* | 5/2012 | Santhanam et al. | 370/254 |

FOREIGN PATENT DOCUMENTS

| | | |
|---|---|---|
| CN | 102088780 A | 6/2011 |
| WO | WO 2011/093579 A2 | 8/2011 |

OTHER PUBLICATIONS

"eICIC for HeNB UL and MUE DL based on HeNB UL Measurement", I2R, 3GPP TSG RAN WG1 Meeting #62, Aug. 23-27, 2010, 5 pages.

"Mobility support to pico cells in the co-channel HetNet deployment", Samsung, 3GPP TSG RAN WG2 #70bis, Jun. 28-Jul. 2, 2010, 9 pages.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, Mar. 2010, 104 pages.

\* cited by examiner

A serving base station sends a user identity of a served user equipment to an adjacent second base station, coordinates a radio resource with the second base station, and obtains a coordinated radio resource for scheduling the user equipment corresponding to the user identity, so that a base station that is adjacent to a base station using the coordinated resource to schedule the user equipment corresponding to the user identity avoids using the coordinated radio resource ⟶ 11

The serving base station uses the coordinated radio resource to schedule the user equipment corresponding to the user identity ⟶ 12

FIG. 1

After configuring a radio resource, send, to a second base station, a resource use indication used to indicate that the configured radio resource is started to be used, so that the second base station avoids using the configured radio resource or uses it at reduced power ⟶ 21

Use the configured radio resource to schedule a user equipment ⟶ 22

FIG. 2

METHOD, BASE STATION, AND RADIO COMMUNICATION SYSTEM FOR REDUCING INTER-CELL SIGNAL INTERFERENCE

CROSS-REFERENCE TO RELATED APPLICATION

This application is a continuation of International Application No. PCT/CN2012/081417, filed on Sep. 14, 2012, which claims priority to Chinese Patent Application No. 201110271809.4, filed on Sep. 14, 2011, both of which are hereby incorporated by reference in their entireties.

TECHNICAL FIELD

The present invention relates to a communications technology, and in particular, to a method, a base station, and a radio communication system for reducing inter-cell signal interference.

BACKGROUND

With the development of mobile broadband, bandwidth requirements of end users are increasing. An existing networking manner in which a macro base station is used as a main part, however, cannot meet a bit rate required by a mobile broadband service.

To further improve system capacity, more low-power access points or small-cell base stations (collectively called small-cell base station below), for example, access points (access point) such as a home base station (Home eNodeB), a microbase station (micro eNodeB), a pico base station (pico eNodeB), a relay base station (Relay eNodeB), a femto base station (femto eNodeB), and a remote radio head (RRH, Remote Radio Head) in a Long Term Evolution (Long Term Evolution, LTE) technology, may be introduced in a range of the macro base station.

Transmit power of a small-cell base station is lower than transmit power of a macro base station, and downlink coverage of a small-cell base station is far less than downlink coverage of a macro base station. A hybrid networking manner with a macro base station and a small-cell base station can enhance coverage of a hot spot area, coverage of an indoor blind spot (or weak spot), and cell edge coverage of the macro base station, improve average cell throughput, cell edge throughput, and an uplink/downlink spectrum utilization rate of a cell, and reduce network costs and CAPEX (capital expenditure) of an operator, and the like. We call it a heterogeneous network.

When moving in a heterogeneous network in which a small-cell base station and a macro base station use an intra-frequency networking manner, a user equipment (UE) may pass through the small-cell base station. When passing through a border of the small-cell base station and the macro base station, the UE needs to perform a switchover. It is found out through studies that during a switchover on a heterogeneous network, a switchover failure rate of a UE is relatively high due to an interference cause. For example, resulting from downlink interference of a macro cell on a small cell, a failure occurs due to that a UE served by the small cell is difficult to receive downlink information; or for another example, when a UE served by a macro cell moves to a central area position of a small cell, resulting from downlink interference of the small cell on the macro cell, a failure occurs due to that the UE served by the macro cell is difficult to receive downlink information; for still another example, resulting from uplink interference of a UE served by a small cell on a UE served by a macro cell, a failure occurs due to that the macro cell cannot receive uplink information of the UE served by the macro cell.

If there are more small-cell base stations in a heterogeneous network, a UE needs to perform a switchover more frequently, and frequent switchover brings a large number of signaling and processing loads to the network. If the UE is not allowed to perform a switchover, so as to reduce the number of switchover times, the UE drops a call due to an interference problem. For example, if no switchover is performed when a UE served by a macro cell passes through a small cell, downlink of the small cell brings about strong downlink interference on the UE when the UE enters a center of the small cell, which causes the UE to drop a call.

SUMMARY

Embodiments of the present invention provide a method, a base station, and a radio communication system for reducing inter-cell signal interference, so as to reduce signal interference between cells.

An embodiment of the present invention provides a method for reducing inter-cell signal interference, including:

sending, by a serving base station, a user identity of a served user equipment to an neighboring second base station, coordinating a radio resource with the second base station, and obtaining a coordinated radio resource for scheduling the user equipment corresponding to the user identity, so that a base station that is neighboring to a base station using the coordinated radio resource to schedule the user equipment corresponding to the user identity avoids using the coordinated radio resource; and using, by the serving base station, the coordinated radio resource to schedule the user equipment corresponding to the user identity.

An embodiment of the present invention further provides a method for reducing inter-cell signal interference, including:

receiving, by a second base station, a user identity, sent by an neighboring serving base station, of a user equipment served by the serving base station, coordinating a radio resource with the serving base station, and obtaining a coordinated radio resource for scheduling the user equipment corresponding to the user identity, so that the coordinated radio resource can be used for scheduling only the user equipment corresponding to the user identity; and when the serving base station uses the coordinated radio resource to schedule the user equipment corresponding to the user identity, avoiding, by the second base station, using the coordinated radio resource.

An embodiment of the present invention further provides a first base station for reducing inter-cell signal interference, including:

a coordinating unit, configured to send a user identity of a served user equipment to an neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource; and a scheduling unit, configured to use the coordinated radio resource to schedule the user equipment corresponding to the user identity.

An embodiment of the present invention further provides a second base station for reducing inter-cell signal interference, including:

a coordinating unit, configured to receive a user identity, sent by an neighboring serving base station, of a user equipment served by the serving base station, coordinate a radio resource with the serving base station, and obtain a coordinated radio resource for scheduling the user equipment corresponding to the user identity, so that the coordinated radio resource can be used for scheduling only the user equipment corresponding to the user identity; and a resource disabling unit, configured to: when the serving base station uses the coordinated radio resource to schedule the user equipment corresponding to the user identity, avoid using the coordinated radio resource.

An embodiment of the present invention further provides a radio communication system, including the first base station for reducing inter-cell signal interference and the second base station for reducing inter-cell signal interference, where the first base station is neighboring to the second base station.

According to the method, the base station, and the radio communication system for reducing inter-cell signal interference that are provided in the embodiments of the present invention, a serving base station of a user equipment sends a user identity to an neighboring second base station and coordinates a radio resource with the second base station, so that a base station that is neighboring to a base station using the coordinated radio resource to schedule the user equipment corresponding to the user identity avoids using the coordinated radio resource. In this way, the coordinated radio resource is not simultaneously used by neighboring base stations or simultaneously used by neighboring base stations at relatively high power, thereby effectively reducing inter-cell signal interference.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a flowchart of a method for reducing inter-cell signal interference according to an embodiment of the present invention;

FIG. 2 is a flowchart of another method for reducing inter-cell signal interference according to an embodiment of the present invention;

DETAILED DESCRIPTION

Figure 3:
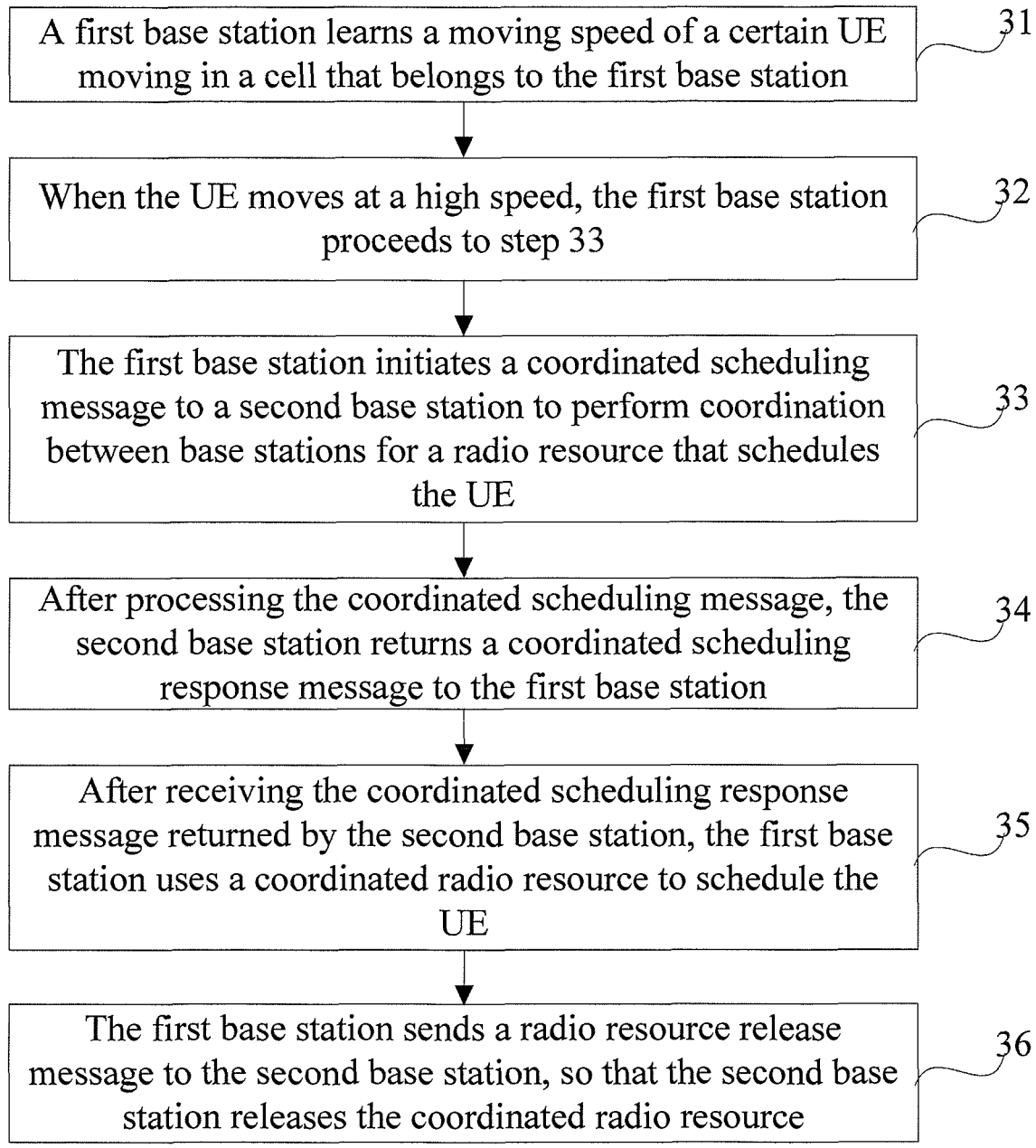
FIG. 3 is a flowchart of still another method for reducing inter-cell signal interference according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

FIG. 1 is a flowchart of a method for reducing inter-cell signal interference according to an embodiment of the present invention. As shown in FIG. 1, the method includes the following steps:

Step 11: A serving base station sends a user identity of a served user equipment to an neighboring second base station, coordinates a radio resource with the second base station, and obtains a coordinated radio resource for scheduling the user equipment corresponding to the user identity, so that a base station that is neighboring to a base station using the coordinated radio resource to schedule the user equipment corresponding to the user identity avoids using the coordinated radio resource. The avoidance of use means that the coordinated radio resource may be used at a same frequency at different time, or used at different frequencies at same time, or used at reduced power, as long as it can be orthogonal in a time domain, a frequency domain, a code domain, or a space domain. Alternatively, for a same user equipment (UE), two base stations simultaneously use the coordinated radio resource to perform coordinated scheduling.

Step 12: The serving base station uses the coordinated radio resource to schedule the user equipment corresponding to the user identity.

In this embodiment, a serving base station of a user equipment sends a user identity to an neighboring second base station and coordinates a radio resource with the second base station, so that a base station that is neighboring to a base station using the coordinated radio resource to schedule the user equipment corresponding to the user identity avoids using the coordinated radio resource. In this way, the coordinated radio resource is not simultaneously used by neighboring base stations or simultaneously used by neighboring base stations at relatively high power, thereby effectively reducing inter-cell signal interference.

A base station may be an eNB, an RNC, or an RRH (remote radio head). In an RRH scenario, radio resource coordination between base stations may be radio resource coordination between an eNB and an RRH. Traditionally, a base station is an eNB.

Using the coordinated radio resource to schedule the user equipment includes: scheduling control signaling or data delivered to the UE; or includes: scheduling the UE to send uplink signaling or data.

Coordinating a radio resource with the second base station may include:

sending, by the serving base station, a coordinated radio resource or a radio resource identity for scheduling the user equipment to the second base station; specifically, the serving base station may acquire a measurement report reported by the user equipment for a cell of the second base station and send information of a radio resource planned to be used for scheduling the user equipment to the second base station, that is, coordinate a radio resource.

Alternatively, coordinating a radio resource with the second base station may include:

sending, by the serving base station, service quality information of a bearer of the user equipment and a coordinated radio resource or a radio resource identity for scheduling the user equipment to the second base station.

Alternatively, coordinating a radio resource with the second base station may include:

sending, by the serving base station, service quality information of a bearer of the user equipment to the second base station; and receiving, by the serving base station, information of the coordinated radio resource that is determined by the second base station.

Alternatively, coordinating a radio resource with the second base station may include:

sending, by the serving base station, a coordinated radio resource or a radio resource identity of the user equipment to the second base station; and receiving, by the serving base station, one or a combination of information of the coordinated radio resource that is determined by the second base station and a coordination result.

Alternatively, coordinating a radio resource with the second base station may include:

sending, by the serving base station, a coordinated radio resource or a radio resource identity of the user equipment and service quality information of a bearer of the user equipment to the second base station; and receiving, by the serving base station, one or a combination of information of the coordinated radio resource that is determined by the second base station and a coordination result.

The radio resource identity may be a radio resource number. That is, each radio resource number is bound to corresponding radio resource information. Both coordination parties may separately store correspondence between a radio resource number and radio resource information and perform negotiation simply by sending a radio resource number during coordination. When both the coordination parties reach an agreement on a certain radio resource number, both the coordination parties determine a coordinated radio resource.

Further, coordinating a radio resource with the second base station may further include:

indicating, by the serving base station to the second base station, a duration of occupying a radio resource for scheduling the user equipment and/or coordinated effective time.

Further alternatively, coordinating a radio resource with the second base station may further include:

indicating, by the serving base station to the second base station, a duration of occupying a radio resource for scheduling the user equipment and/or coordinated effective time; and acquiring, by the serving base station, a schedulable duration and/or coordinated effective time of the coordinated radio resource according to a message returned by the second base station. The schedulable duration of the coordinated radio resource may be implicit or explicit; being implicit means that for use of the coordinated radio resource, the coordinated radio resource is released after a base station that avoids the use receives a release message, and being explicit means that the schedulable duration of the coordinated radio resource is informed by a base station in a signaling manner. The coordinated effective time of the coordinated radio resource may also be implicit or explicit; being implicit means that the coordinated radio resource may become effective after the serving base station receives a message fed back by the second base station, and being explicit means that the coordinated effective time of the coordinated radio resource is informed by the second base station in a signaling manner.

Releasing the coordinated radio resource means no longer stopping using the coordinated radio resource to schedule another UE or no longer using the coordinated radio resource at reduced power to schedule another UE, that is, normally using the coordinated radio resource to schedule a UE.

Alternatively, it may also be that after the second base station sends or receives a request for coordinating a radio resource, the serving base station or the second base station starts a preset timer. That is, a coordination message may not include time information, but both the coordination parties have an agreement.

It is similar for effective time. It may also be that the effective time is not included in a message, but both parties have an agreed rule. For example, the coordinated radio resource becomes effective immediately after the second base station receives a message, or the coordinated radio resource becomes effective immediately after the second base station sends a feedback message, or the coordinated radio resource becomes effective immediately after a first base station receives a returned message.

Further, a process of coordinating a radio resource with the second base station further includes: sending, by the serving base station to the second base station, a cause value for identifying a cause of coordinating a radio resource.

Optionally, before coordinating a radio resource with the second base station, the method further includes: determining, by the serving base station, not to handover the user equipment corresponding to the user identity to the second base station.

Specifically, a process of determining not to switch the user equipment corresponding to the user identity over to the second base station may include: determining, by the serving base station according to a moving speed of the user equipment corresponding to the user identity or according to permission information, for a cell of the second base station, of the user equipment corresponding to the user identity or information that the second base station cannot be switched over to, not to switch the user equipment corresponding to the user identity over to the second base station.

The moving speed of the user equipment corresponding to the user identity is obtained according to historical information of the user equipment corresponding to the user identity.

The permission information for the cell of the second base station is reported by the user equipment corresponding to the user identity to the serving base station after the user equipment reads a broadcast message of the second base station.

The information that the second base station cannot be switched over to may specifically be an indication that directly indicates that the second base station cannot be switched over to or an implicit indication such as overload or a high load.

The method for reducing inter-cell signal interference provided in this embodiment of the present invention may further include: adding speed assessment in an idle state, the number of cell reselection times and reselection time, or cell type information or a cell identity, and residence time in each cell that are reported by the user equipment into the historical information of the user equipment.

After coordinating, by the serving base station, a radio resource with the second base station, the method further includes:

sending, by the serving base station, a switchover request message to the second base station, and receiving a switchover request acknowledgment message returned by the second base station for the switchover request message; and a process of using, by the serving base station, the coordinated radio resource to schedule the user equipment corresponding to the user identity includes: using, by the serving base station, the coordinated radio resource to send a switchover command message to the user equipment corresponding to the user identity.

During coordinating a radio resource with the second base station, the method further includes: performing a switchover preparation operation with the second base station, where information sent by the serving base station to the second base station is carried by using a switchover request message, and information that is received by the serving base station and sent by the second base station is carried by using a switchover request acknowledgment message.

For example, the serving base station uses a switchover request message to send a target cell identity, a radio resource control (Radio Resource Control, RRC) context (context), the historical information of the user equipment, and service quality information of a bearer of the user equipment to the second base station.

The serving base station receives a switchover request acknowledgment message returned by the second base station, where the switchover request acknowledgment message may carry at least one of the following: service quality information of the user equipment and a switchover command message sent by the second base station to the user equipment.

The foregoing switchover request message may further carry a pre-switchover indication, where the pre-switchover indication is used to indicate, to the second base station, that a switchover of the user equipment performed by the serving base station will be completed by using a subsequent switchover message, or is used to indicate, to the second base station, that a subsequent switchover message of the user equipment needs to be waited for, or is used to indicate, to the second base station, that the switchover request message aims at coordinated scheduling. In this way, the second base station does not need to set a timer to decide whether to cancel switchover preparation. When the switchover request message does not include the foregoing pre-switchover indication, the second base station needs to set a timer, and previous switchover preparation work is canceled if no switchover request is sent within a specified time.

The process of using, by the serving base station, the coordinated radio resource to schedule the user equipment corresponding to the user identity includes: using, by the serving base station, the coordinated radio resource to send the switchover command message to the user equipment corresponding to the user identity; or includes: sending, by the serving base station, a switchover cancellation message to the second base station, so as to indicate, to the second base station, that the coordinated radio resource needs to be released.

After coordinating a radio resource with the second base station, the method may further include:

sending, by the serving base station, the switchover command message to the user equipment; and avoiding, by the serving base station, using the coordinated radio resource.

After sending the switchover command message to the user equipment, the serving base station may further start a timer.

After avoiding, by the serving base station, using the coordinated radio resource, the following may further be included:

releasing, by the serving base station, the coordinated radio resource after receiving information that is sent by the second base station to the serving base station and indicates that the coordinated radio resource needs to be released; or releasing, by the serving base station, the coordinated radio resource at a preset time. In this way, a base station can continue to use the released coordinated radio resource to schedule another UE.

Correspondingly, on a second base station side, the method for reducing inter-cell signal interference provided in this embodiment of the present invention includes:

receiving, by a second base station, a user identity, sent by an neighboring serving base station, of a user equipment served by the serving base station, coordinating a radio resource with the serving base station, and obtaining a coordinated radio resource for scheduling the user equipment corresponding to the user identity, so that the coordinated radio resource can be used for scheduling only the user equipment corresponding to the user identity; and when the serving base station uses the coordinated radio resource to schedule the user equipment corresponding to the user identity, avoiding, by the second base station, using the coordinated radio resource.

A process of coordinating a radio resource with the serving base station may include: receiving, by the second base station, a coordinated radio resource or a radio resource identity for scheduling the user equipment sent by the serving base station; or may include: receiving, by the second base station, service quality information of a bearer of the user equipment and a coordinated radio resource or a radio resource identity for scheduling the user equipment that are sent by the serving base station; or may include: receiving, by the second base station, service quality information of a bearer of the user equipment sent by the serving base station; and sending, by the second base station, information of the determined coordinated radio resource to the serving base station; or may include: receiving, by the second base station, a coordinated radio resource or a radio resource identity of the user equipment sent by the serving base station; and sending, by the second base station, one or a combination of information of the coordinated radio resource that is determined and a coordination result to the serving base station; or may include: receiving, by the second base station, a coordinated radio resource or a radio resource identity of the user equipment and service quality information of a bearer of the user equipment that are sent by the serving base station; and sending, by the second base station, one or a combination of information of the coordinated radio resource that is determined and a coordination result to the serving base station.

Further, the process of coordinating a radio resource with the serving base station may further include: receiving, by the second base station, a duration of occupying a radio resource for scheduling the user equipment and/or coordinated effective time that are indicated by the serving base station.

Further alternatively, the process of coordinating a radio resource with the serving base station may further include:

receiving, by the second base station, a duration of occupying a radio resource for scheduling the user equipment and/or coordinated effective time that are indicated by the serving base station; and returning, by the second base station, a message to the serving base station, so that the serving base station acquires a schedulable duration and/or coordinated effective time of the coordinated radio resource according to the returned message.

Further, the process of coordinating a radio resource with the serving base station may further include: receiving, by the second base station, a cause value that is used for identifying a cause of coordinating a radio resource and sent by the serving base station.

After avoiding, by the second base station, using the coordinated radio resource, the following may further be included:

receiving, by the second base station, information that is sent by the serving base station and indicates that the coordinated radio resource needs to be released; or automatically releasing, by the second base station, the coordinated radio resource according to the schedulable duration of the coordinated radio resource.

Information received by the second base station from the serving base station is carried by using a switchover request message, and information sent by the second base station to the serving base station is carried by using a switchover request acknowledgment message.

Further, the switchover request message may further carry a pre-switchover indication, where the pre-switchover indication is used to indicate, to the second base station, that a subsequent switchover message of the user equipment needs to be waited for.

After avoiding, by the second base station, using the coordinated radio resource, the following may further be included:

identifying, by the second base station, that the user equipment corresponding to the user identity accesses the second base station, and using the coordinated radio resource to schedule the user equipment corresponding to the user identity.

After using the coordinated radio resource to schedule the user equipment corresponding to the user identity, the following may further be included:

sending, by the second base station to the serving base station, information indicating that the coordinated radio resource needs to be released, so that the serving base station releases the coordinated radio resource.

FIG. 2 is a flowchart of another method for reducing inter-cell signal interference according to an embodiment of the present invention. As shown in FIG. 2, the method includes the following steps:

Step 21: After configuring a radio resource, send, to a second base station, a resource use indication used to indicate that the configured radio resource is started to be used, so that the second base station avoids using the configured radio resource or uses it at reduced power.

For example, the second base station configures a radio resource for a first base station, or an operation, administration and maintenance system configures a radio resource for the first base station and the second base station simultaneously.

The resource use indication includes time when the configured radio resource is used, so that the second base station stops using the configured radio resource from the time.

Step 22: Use the configured radio resource to schedule a user equipment.

The foregoing step 21 and step 22 may be executed by the first base station. The first base station may be a macro base station and may also be a small-cell base station.

After step 22, the following may further be included:

sending, to the second base station, a resource use stop indication used to inform the second base station that the first base station stops using the configured radio resource, so that the second base station releases the configured radio resource.

The following specifically describes the foregoing method for reducing inter-cell signal interference through Embodiment 1 to Embodiment 4.

Embodiment 1

In this embodiment, a serving base station is a first base station, which is a macro base station, and an neighboring second base station is a small-cell base station. Persons skilled in the art should understand that it may be extended to the first base station is a small-cell base station and the second base station is a macro base station or both the first base station and the second base station are macro base stations. It is assumed that a certain UE moves at a high speed in scenario 1. Because an entire process from meeting, by the UE, a measurement threshold to initiating a measurement report and executing a switchover requires some time, when a moving speed of the UE is relatively high, the UE has probably moved to a central position of the small-cell base station before the switchover is completed, and signal strength of the small-cell base station rises abruptly. As a result, the UE served by the macro base station suffers strong interference from the small-cell base station, thereby triggering a switchover failure. Even if the UE switchover is successful, the UE quickly leaves because the moving speed is relatively high, which brings an unnecessary switchover. Because each switchover process requires a lot of signaling overhead, it simultaneously brings switchover interruption to a user.

As shown in FIG. 3, for scenario 1, this embodiment includes the following steps:

Step 31: The first base station learns a moving speed of a certain UE moving in a cell that belongs to the first base station.

Specifically, the moving speed of the UE may be obtained through calculation by using a parameter in the prior art. In the prior art, historical information, including a list of an identity of a cell connected when the UE previously remains in a connected state, a connection duration of a connected cell, cell size information of a connected cell, and the like, of the UE is transferred between base stations during a switchover. The first base station uses the historical information of the UE to estimate the speed of the UE according to the cell size information and the connection duration. Specifically, a cell radius may be estimated by using the cell size information, and then the speed of the UE is estimated by dividing a cell diameter by the connection duration. For example, a diameter of large-size cell is converted into 600 m, and if residence time is 60 s, the speed of the UE is 600 m/60 s=10 m/s=36 km/h.

Step 32: When the UE moves at a high speed, the first base station proceeds to step 33.

Step 33: The first base station initiates a coordinated scheduling message to the second base station to perform coordination between base stations for a radio resource that schedules the UE. Optionally, before the first base station initiates the coordinated scheduling message, the first base station determines not to initiate a switchover. The initiated coordinated scheduling message may specifically include one or a combination of the following parameters:

Parameter 1: information of an uplink or downlink radio resource for scheduling the UE, namely, a coordinated radio resource i. The radio resource may specifically be a radio resource that is currently used for (or schedules) the UE or that is expected to be used (or scheduled); and/or ii. the radio resource may specifically be uplink or downlink; and/or iii. the radio resource may specifically be a time domain, frequency domain, code domain, space domain, or power resource, or a combination thereof; and/or iv. the radio resource may specifically include: physical resource block (Physical Resource Block, PRB) information and/or subframe (Subframe) information, power information, and almost blank subframe (almost blank subframe, ABS) pattern (pattern) information.

The PRB information may specifically be an index (index), the subframe information may specifically be an index or a bitmap pattern, which indicates a subframe scheduled within a time slice, and the power information may be a transmit power value.

Parameter 2: duration

The duration is a time length of a coordinated radio resource or time for which the coordinated radio resource needs to be used (scheduled).

Parameter 3: cause value

The cause value may specifically be used to indicate that a radio resource is coordinated for a high-speed UE, a short-term resident UE, coordinated scheduling, not having a switchover condition, or no switchover.

Parameter 4: information of effective time

The information of effective time may be specifically used to indicate coordinated effective time, and it may be becoming effective immediately or becoming effective at a specified time.

Parameter 5: coordinated scheduling time T5

The coordinated scheduling time T5 indicates a time length expected by the first base station for using a coordinated radio resource.

Step 34: After processing the coordinated scheduling message, the second base station returns a coordinated scheduling response message to the first base station, where the coordinated scheduling response message specifically includes one or a combination of the following parameters:

Parameter 1: uplink or downlink radio resource for scheduling the UE

The radio resource may specifically be a radio resource that is expected to be used (or scheduled); and/or the radio resource may specifically be uplink or downlink; and/or the radio resource may specifically be a time domain, frequency domain, code domain, space domain, or power resource, or a combination thereof; and/or the radio resource may specifically include: PRB information and/or subframe (Subframe) information, power information, and ABS pattern (pattern) information.

The PRB information may specifically be an index (index), the subframe information may specifically be an index or a bitmap pattern, which indicates a subframe scheduled within a time slice, and the power information may be a transmit power value.

Optionally, when the coordinated scheduling response message includes the foregoing parameter, it indicates that the second base station modifies a radio resource that is transferred by the first base station by using the coordinated scheduling message, and the parameter is used to determine a radio resource that the first base station should use.

Parameter 2: duration

The duration refers to a time length, expected by a UE, of a coordinated radio resource or time for which the coordinated radio resource is used (scheduled).

Parameter 3: coordination result

The coordination result includes acceptance, rejection, or accepting a modified radio resource. Optionally, when the coordination result is acceptance or rejection, the foregoing parameter 1 may be omitted.

Parameter 4: cause value

The cause value is used to indicate a cause for the coordination result being rejection or accepting a modified radio resource, and it may be no available resource. Optionally, when the coordination result is acceptance, the cause value may be omitted.

Parameter 5: coordinated scheduling time T6

The coordinated scheduling time T6 indicates a time length expected by the second base station for using a coordinated radio resource.

If the second base station accepts coordination, the second base station avoids using a radio resource that has been coordinated, namely, a coordinated radio resource. The second base station may specifically avoid using the coordinated radio resource from effective time that has been coordinated.

After the foregoing step 33 and step 34, if the first base station and the second base station coordinate an agreed radio resource, namely, a coordinated radio resource, proceed to step 35.

Step 35: After receiving the coordinated scheduling response message returned by the second base station, the first base station uses the coordinated radio resource to schedule the UE.

Step 36: The first base station sends a radio resource release message to the second base station, so that the second base station releases the coordinated radio resource. The radio resource release message may specifically include: information of effective time and a cause value. The information of effective time may specifically be becoming effective immediately or becoming effective at a specified time. The cause value indicates a cause for releasing the coordinated radio resource.

In this embodiment, a first base station learns that a UE is in a high-speed state according to a moving speed of the UE. For a UE that moves at a high speed, the first base station coordinates a radio resource used by the UE with a second base station. In this way, when the UE passes through coverage of the second base station, the UE does not drop a call due to strong interference of the second base station, although no switchover occurs. In other words, for a UE that moves at a high speed, after learning a speed of the UE, a macro base station does not switch the UE over to a small-cell base station but continues to allow the UE to be served by the macro base station, even if the UE approaches the small-cell base station, which avoids an unnecessary switchover, improves switchover efficiency, and avoids an increase in a switchover failure rate. In addition, coordinating a radio resource by the macro base station and the small-cell base station avoids a problem of suffering strong downlink interference from the small-cell base station due to no switchover when the UE moves to a central area of the small-cell base station and also avoids a problem of bringing, by uplink of the UE, strong uplink interference to another UE under the small-cell base station due to no switchover when the UE approaches the small-cell base station.

Embodiment 2

In this embodiment, a first base station is a macro base station, and a second base station is a small-cell base station. Persons skilled in the art should understand that it may be extended to being in an opposite direction or between macro base stations. It is assumed that in scenario 2, when a UE served by the macro base station measures that a signal of the small-cell base station is relatively strong, the small-cell base station is requested to switch the UE over to the small-cell base station; but the small-cell base station rejects a switchover of the UE due to overload (for example, backhaul link transmission resource overload or processing resource overload), that is, the macro base station cannot switch the UE that requires a switchover over to the small-cell base station. It is assumed that in another scenario 3, when a UE served by the macro base station approaches a cell with a closed user group, the macro base station cannot switch the UE that requires a switchover over to the small-cell base station, because the UE does not have an access permission. As the UE moves, especially when the UE is in a central position of the small-cell base station, the UE suffers strong downlink interference from the small-cell base station and therefore may drop a call. At the same time, the UE itself also brings strong uplink interference to the small-cell base station.

For scenario 2 or scenario 3, this embodiment differs from Embodiment 1 in the following: In this embodiment, according to information such as permission information of a UE for a target cell and information that a target cell cannot be switched over to, it is determined that a switchover to the target cell cannot be initiated or the target cell does not support a switchover (or access) of the UE, and then a scheduling coordination request is initiated to the second base station. The details are as follows:

First, the first base station learns that the target cell does not support the switchover (or access) of the UE. It may specifically be determined, according to the following information, that the switchover to the target cell cannot be initiated or the target cell does not support the switchover (or access) of the UE:

The UE is not a user of the target cell, or the UE is not a user of a target closed user group, or a closed user group list of the UE does not match the target closed user group;

or the target cell is overloaded, for example, a target cell transmission resource is overloaded, and a processing capability is overloaded.

The others are the same as step 33 to step 36 in Embodiment 1.

In this embodiment, a first base station determines that a UE cannot be switched and then coordinates a radio resource used by the UE with a second base station. In this way, when the UE passes through coverage of the second base station, the UE does not drop a call due to strong interference of the second base station, although no switchover occurs.

Embodiment 3

In this embodiment, a serving base station is a first base station, which is a macro base station, and a second base station is a small-cell base station. Persons skilled in the art should understand that it may be extended to being in an opposite direction or between macro base stations. It is assumed that in scenario 4 that is basically the same as scenario 1, a certain UE that moves at a high speed moves into coverage of a target cell and subsequently remains in the target cell. In this case, if scheduling is coordinated all the time, it goes against improvement of a resource utilization rate. It is assumed that in scenario 5, a certain UE may move between two cells, and it may switch between the two cells back and forth, namely, a scenario in which the UE switches between the two cells in a ping-pong manner.

For the foregoing scenario 1, scenario 4, or scenario 5, this embodiment provides a corresponding method for reducing inter-cell signal interference, so as to avoid frequent switchover.

Figure 4:
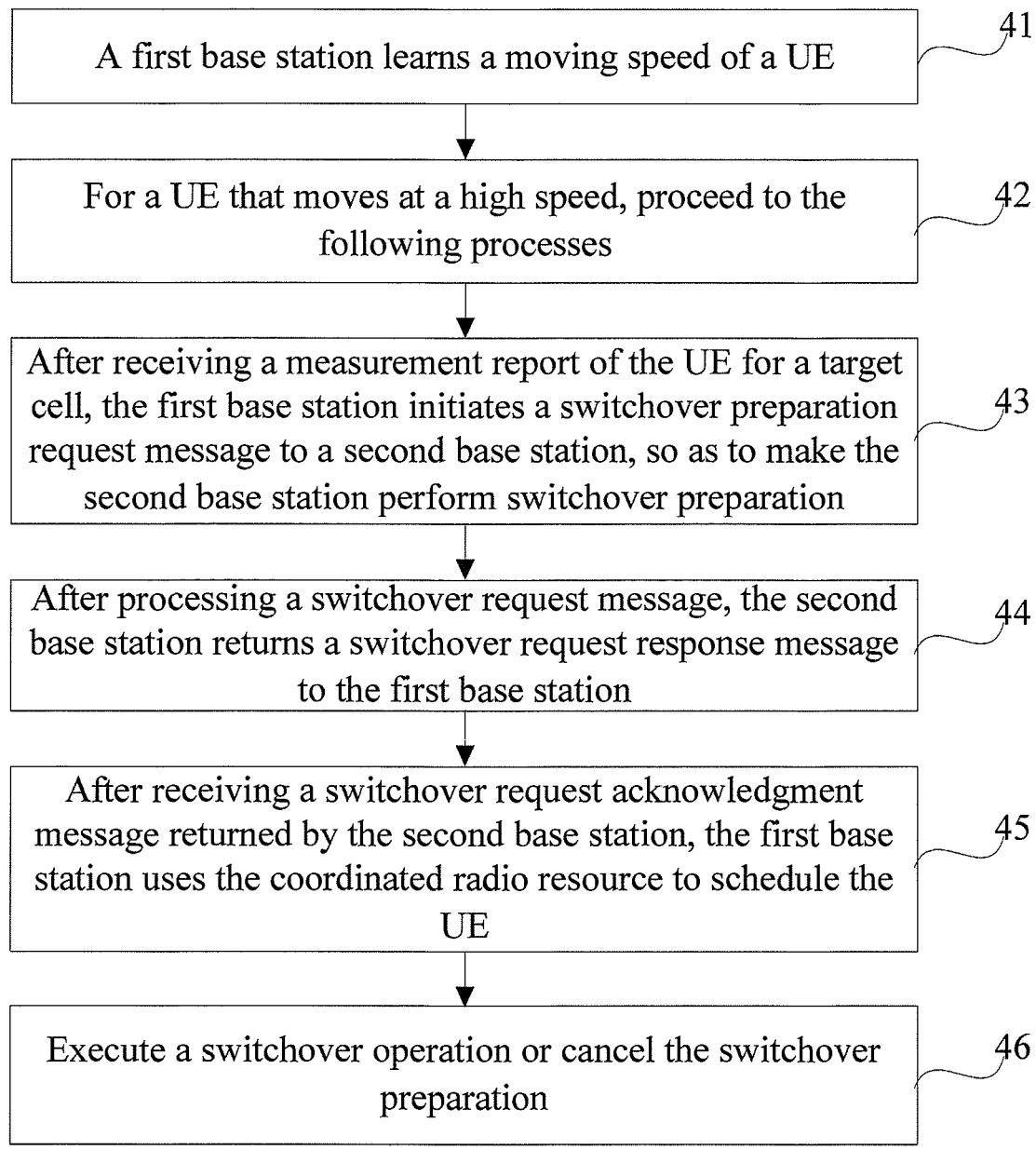
FIG. 4 is a flowchart of yet another method for reducing inter-cell signal interference according to an embodiment of the present invention.

As shown in FIG. 4, specific steps are as follows:

Step 41: The first base station learns a moving speed of a UE. For details, see the description in the foregoing Embodiment 1. Optionally, for scenario 5, this step may be omitted.

Step 42: For a UE that moves at a high speed, proceed to the following processes. Optionally, for scenario 5, this step may be omitted.

Step 43: The first base station initiates a switchover preparation request message to the second base station, so as to make the second base station perform switchover preparation. The switchover preparation request message may specifically not only include a parameter carried in the coordinated scheduling message in step 33 in Embodiment 1 but also include the following parameters: a target cell identity, an RRC Context, historical information of the UE, and service quality information of a bearer (or service) of the UE. Optionally, switchover hysteresis time T1 (switchover delay time or switchover wait time) may further be included. Optionally, a pre-switchover indication may further be included. The pre-switchover indication is used to indicate, to the second base station, that a switchover of the user equipment performed by the serving base station will be completed by using a subsequent switchover message, or is used to indicate, to the second base station, that a subsequent switchover message of the user equipment needs to be waited for, or is used to indicate, to the second base station, that a switchover request message aims at coordinated scheduling.

The service quality information of the bearer (or service) of the UE may specifically include: an identity of each bearer of the UE and a quality of service (Quality of Service, Qos) parameter, for example, a Qos class identifier (Qos Class Identifier, QCI), an allocation and retention priority (Allocation and Retention Priority, ARP), a maximum bit rate, and a guaranteed bit rate, of each bearer of the UE.

The switchover hysteresis time T1 (switchover delay time or switchover wait time) indicates time that the second base station waits for UE switchover access. When this time times out, that is, when UE switchover access does not occur in the T1 time segment or the first base station does not initiate a switchover request, and the second base station releases a coordinated radio resource reserved for the UE.

Step 44: After processing a switchover request message, the second base station returns a switchover request response message, namely, a switchover request acknowledgment message, to the first base station. The switchover request message may not only include a parameter the same as a parameter in step 34 of Embodiment 1, but also include the service quality information of the bearer (or service) of the UE and a switchover command message that is sent to the UE.

The service quality information of the bearer (or service) of the UE may specifically include at least an acceptable bearer identity and one of Qos parameters of each bearer, where the Qos parameters of each bearer may be a QCI, an ARP, a maximum bit rate, a guaranteed bit rate, and the like.

If the second base station accepts the switchover preparation, the second base station needs to avoid using the coordinated radio resource.

If the second base station sets a timer according to the switchover hysteresis time T1 received in step 43 and the timer times out, the second base station automatically cancel a switchover preparation process. Alternatively, the second base station does not set a timer; instead, the second base station waits, according to the pre-switchover indication, for the serving base station to initiate a switchover execution or switchover cancellation message, and cancels the switchover preparation process only when receiving the switchover cancellation message sent by the serving base station.

Step 45: After receiving the switchover request acknowledgment message returned by the second base station, the first base station uses the coordinated radio resource to schedule the UE.

Step 46: Execute a switchover operation or cancel the switchover preparation.

Specifically, executing a switchover includes the following steps:

Optionally, in a first step, the first base station sends a switchover execution message (or a switchover preparation completion message) to the second base station, so as to inform the second base station that the UE will be switched over to the second base station.

In a second step, the first base station sends a switchover command message to the UE, delivering the switchover command message carried in the switchover request acknowledgment message in step 44 to the UE.

The first base station may initiate the switchover operation based on time when coordinated scheduling is performed on the UE and a measurement report of the UE. For example, after a preset time threshold T2 passes, the measurement report of the UE displays that: a signal of the second base station is still very strong, and a switchover threshold is met. In particular, the preset time threshold T2 is less than T1, that is, the switchover is completed before the second base station cancels the switchover preparation process.

Canceling the switchover preparation includes at least one of the following operations:

Operation 1: The first base station sends a switchover cancellation message to the second base station to cancel the previous switchover preparation process. This cancellation operation may specifically be based on the measurement report of the UE. For example, after a preset time threshold T3 passes, the measurement report of the UE displays that the signal of the second base station is already very weak and has very small downlink interference on the UE, and then this operation for canceling the switchover preparation is initiated.

Operation 2: The switchover preparation is automatically canceled when time of the timer expires. That is, the switchover preparation process is automatically canceled when the time of the timer that is set by the second base station according to the switchover hysteresis time T1 received in step 43 expires.

In this embodiment, the first base station decides not to perform a switchover by determining a speed of the UE, and then coordinates a radio resource used by the UE with the second base station. In this way, when the UE passes through coverage of the second base station, or when the UE constantly moves between the first base station and the second base station back and forth, no switchover is initiated, and interference is reduced in a coordinated scheduling manner, so that the UE does not drop a call due to strong interference of the second base station. When the first base station is in a coordination process, the second base station completes the switchover preparation process. In this way, when the UE remains in the second base station for a long time, it is considered that a situation of scenario 4 occurs, and the first base station only needs to further send a switchover execution message to the second base station, so as to enter a switchover execution phase, that is, initiate a switchover to switch the UE over to the small-cell base station for providing a service. When the UE soon moves out of the second base station, a message is sent to the second base station to release the coordinated radio resource, thereby improving the resource utilization rate.

The switchover may be executed in two manners. Specifically, switchover execution may specifically include the following steps:

Step 1: The first base station sends a switchover command message to the UE, that is, uses a negotiated radio resource to schedule the UE (including sending a switchover command); after sending the switchover command to the UE, the first base station releases the coordinated radio resource.

Step 2: The UE accesses the second base station.

Step 3: After discovering the access of the UE, the second base station uses the coordinated radio resource to schedule the UE.

Alternatively, the switchover execution is a traditional process and includes the following steps:

Step 1: The first base station sends a switchover command message to the UE.

Step 2: The UE accesses the second base station.

For the foregoing two switchover execution manners, when the UE is in a switchover process, interference is avoided by coordinating the interference in the switchover process. In addition, once the UE accesses a target cell, the target cell starts to use a coordinated radio resource that is not used previously to schedule the UE, and after delivering a switchover command to the UE, a previous source cell stops using a coordinated radio resource that is used previously, so that interference is also avoided when the UE accesses the target cell.

The foregoing Embodiment 3 may also be applied to another scenario 6. It is assumed that in scenario 6, a certain UE may move between two cells, and then a switchover may occur between the two cells. Because a signal of a source cell or a target cell has changed in a switchover process, interference increases, which causes a switchover failure. Specifically, for example, before the UE disconnects from the source cell, because the signal strength of the source cell decreases, a radio link fails or a switchover command cannot be received, thereby causing a switchover failure; or for example, after the UE disconnects from the source cell, because the signal of the source cell is stronger than the signal of the target cell, interference is introduced and the UE cannot access the target cell, thereby causing a switchover failure. For such a scenario, in a similar switchover process, interference can be reduced in the foregoing coordinated scheduling manner, and switchover success can be ensured.

Optionally, after the UE is switched over to the second base station, the second base station continues to use the coordinated radio resource, which may specifically be implemented in the following manners:

Manner 1: The second base station sends a coordination indication to the first base station to inform the first base station that the second base station will subsequently continue to use the coordinated radio resource, and the first base station avoids using it.

Manner 2: After the access of the UE, the second base station continues to use the coordinated radio resource by default. The first base station avoids using it.

Optionally, when the UE is switched over to the second base station, the first base station may specifically release the coordinated radio resource in the following manners:

Manner 1: After the access of the UE, the second base station sends a release indication to the first base station to indicate, to the first base station, that the coordinated radio resource needs to be released; after receiving the indication, the first base station releases the coordinated radio resource.

Manner 2: After delivering a switchover command to the UE, the first base station automatically releases the coordinated radio resource at a preset time.

Manner 3: After delivering a switchover command to the UE, the first base station immediately releases the coordinated radio resource.

In this embodiment, a first base station coordinates a radio resource used by a UE with a second base station. In this way, when the UE switches between the first base station and the second base station, interference on the UE when the UE receives downlink information/sends uplink information in a source cell is reduced in a coordinated scheduling manner, and interference on the UE during the access to a target cell is reduced at the same time, so that the UE does not drop a call due to the interference. In addition, the first base station and the second base station perform coordination process only once, a UE switchover point is used as a boundary, and a switchover is automatically performed by using and avoiding the coordinated radio resource, thereby implementing control of interference generated between the source cell and the target cell in a UE switchover process and improving resource coordination efficiency.

Embodiment 4

For the foregoing scenario 6, this embodiment further provides a method for reducing inter-cell signal interference, so as to avoid a switchover failure. The method specifically includes the following steps:

Step 1: A first base station and a second base station coordinate a radio resource for a certain UE, which is specifically the same as step 33 and step 34 of Embodiment 1.

Step 2: After the first base station and the second base station coordinate the radio resource, the first base station starts to use the coordinated radio resource to schedule the UE, and the second base station avoids the coordinated radio resource.

Step 3: After deciding to switch the UE over to the second base station, the first base station initiates a switchover request to the second base station.

Step 4: After receiving a switchover request acknowledgment message returned by the second base station, the first base station executes a switchover operation or cancels switchover preparation, and subsequent steps are the same as those of Embodiment 3.

In this embodiment, before a UE switchover, a first base station coordinates a radio resource used by the UE with a second base station or coordinates some radio resources for a subsequent UE switchover. In this way, before the UE is switched and when the UE switches between the first base station and the second base station, interference on the UE when the UE receives downlink information/sends uplink information in a source cell is reduced in a coordinated scheduling manner, and interference on the UE during the access to a target cell is reduced at the same time, so that the UE does not drop a call due to the interference. In addition, the first base station and the second base station perform coordination only once, a UE switchover point is used as a boundary, and a handover is automatically performed by using and avoiding the coordinated radio resource, thereby implementing control of interference generated between the source cell and the target cell in a UE switchover process and improving resource coordination efficiency.

In addition, this embodiment is also applicable to scenario 4 and scenario 5.

Embodiment 5

Different from the foregoing embodiments, in this embodiment, interference is avoided in a manner of configuring a radio resource, which is applicable to the foregoing scenario 1 to scenario 5.

Figure 5:
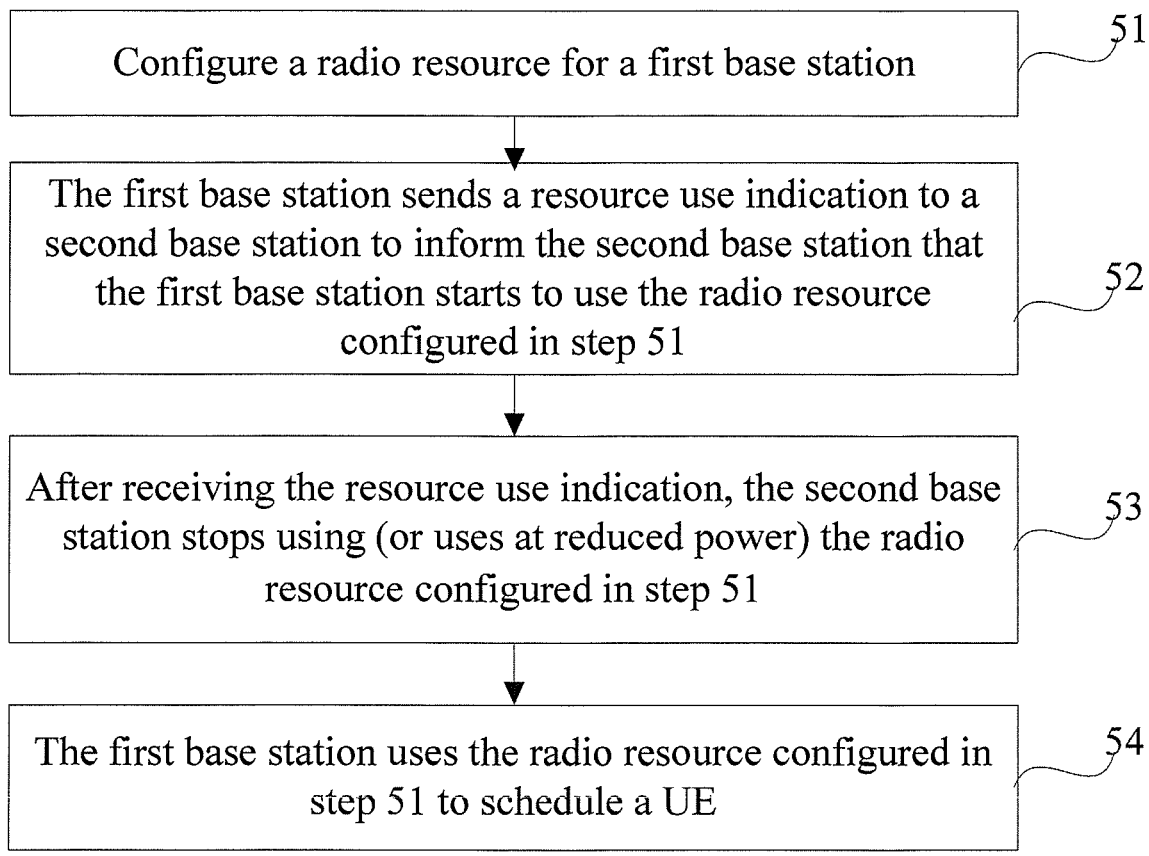
FIG. 5 is a flowchart of a method for reducing inter-cell signal interference according to Embodiment 4 of the present invention.

As shown in FIG. 5, specific steps are as follows:

Step 51: Configure a radio resource for a first base station.

For details about the radio resource, see the description in the foregoing step 33.

Specifically, after being allocated by a second base station, the radio resource may continue to be used until the second base station receives a use request from the first base station. A configuration process may be configuring, by the second base station, the radio resource for the first base station in a signaling manner. Alternatively, the configuration process may be performing, by an operation, administration and maintenance (Operation, Administration and Maintenance, OAM) system, radio resource configuration for the first base station and the second base station separately.

Optionally, an allocation message includes an indication, which is activated when needed, indicating that a recipient needs to send an indication when needing to use the allocated radio resource, and then use of the allocated radio resource is activated.

Optionally, further, before a radio resource is configured, if the first base station has configured the radio resource for the second base station, the radio resource is defined as a radio resource configured by the second base station for the first base station, so as to avoid ambiguity and a conflict. That is, for an overlapped part of configuration, later radio resource configuration cancels previous radio resource configuration, and the later radio resource configuration is executed. In particular, the radio resource may be ABS configuration information.

Step 52: The first base station sends a resource use indication to the second base station to inform the second base station that the first base station starts to use the radio resource configured in step 51.

Optionally, the resource use indication sent by the first base station may include time T6 when the configured radio resource is used. The first base station no longer uses the configured radio resource after the time T6.

Step 53: After receiving the resource use indication, the second base station stops using (or uses at reduced power) the radio resource configured in step 51.

Optionally, if the T6 is received in the second step, a T6 timer is enabled, and the resource is no longer used (or used at reduced power) within the T6 time. After the time T6, the second base station may use the radio resource.

Optionally, after receiving the resource use indication, the second base station notifies the first base station that the radio resource configured in step 51 may be used.

Step 54: The first base station uses the radio resource configured in step 51 to schedule a UE, thereby reducing interference of the second base station on the UE.

Optionally, the first base station sends a resource use stop indication to the second base station to inform the second base station that the first base station may no longer use the radio resource configured in step 51.

In this embodiment, a second base station reserves a radio resource for a first base station, but the reserved resource may still be used by the second base station. When detecting that a UE passes through coverage of the second base station, the first base station sends a message to instruct the second base station to activate the reserved radio resource (that is, the second base station can no longer use it), and then the first base station uses these radio resources to schedule the UE that is served by the first base station and passes through the coverage of the second base station. In this way, although no switchover occurs, because the radio resource is coordinated, the UE does not drop a call due to strong interference of the second base station. In addition, the reserved radio resource is activated only when needed, which improves a utilization rate of the radio resource.

It should be noted that all signaling exchange between a first base station and a second base station involved in the foregoing embodiments is direct signaling interaction or indirect signaling exchange, where the indirect signaling exchange refers to, for example, forwarding information through a core network node. For example, the messages in step 43 and step 44 in the foregoing Embodiment 3 may be direct signaling interaction or indirect signaling exchange between the first base station and the second base station, where the indirect signaling exchange refers to, for example, forwarding information through a core network node. In addition, a negotiated radio resource is used to schedule a UE, which specifically includes scheduling downlink signaling (for example, a switchover command and a random access response), and/or uplink signaling (for example, uplink feedback of the switchover command and a radio resource connection establishment request), and/or uplink and downlink data of the UE. In the foregoing embodiments, a switchover request message is used to notify the other party to perform switchover preparation, and a switchover request acknowledgment message is used to notify the other party that the switchover preparation is completed. In the foregoing embodiments, a user identity carried in a process of coordinating a radio resource aims at performing coordination between two base stations on which coordinated radio resource is used by a user, so as to reduce interference. In the process of coordinating a radio resource, a radio resource identity may further be carried to identify a certain coordinated radio resource. Specifically, for a situation with no switchover, a source base station uses a coordinated radio resource identity to notify the second base station of which radio resource serves as a coordinated radio resource and needs to be avoided. For a switchover scenario, an actual user identity and a coordinated radio resource identity may be carried in a subsequent switchover message to indicate an association between a user and a coordinated radio resource, so that the second base station can obtain the coordinated radio resource according to the user identity and further avoid using or start to use it.

Persons of ordinary skill in the art may understand that all or a part of the steps in the method embodiments may be implemented by a program instructing relevant hardware. The program may be stored in a computer readable storage medium. When the program is run, the steps in the method embodiments are performed. The storage medium includes: any mediums capable of storing program code, such as a ROM, a RAM, a magnetic disk, or an optical disc.

Figure 6:
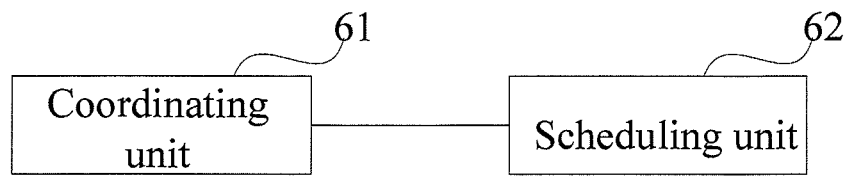
FIG. 6 is a schematic structural diagram of a first base station for reducing inter-cell signal interference according to an embodiment of the present invention.

FIG. 6 is a schematic structural diagram of a first base station for reducing inter-cell signal interference according to an embodiment of the present invention. As shown in FIG. 6, the first base station includes: a coordinating unit 61 and a scheduling unit 62.

The coordinating unit 61 is configured to send a user identity of a served user equipment to an neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource.

The scheduling unit 62 is configured to use the coordinated radio resource to schedule the user equipment corresponding to the user identity.

The coordinating unit 61 may be specifically configured to send a coordinated radio resource or a radio resource identity for scheduling the user equipment to the second base station; or may be specifically configured to send, service quality information of a bearer of the user equipment and a coordinated radio resource or a radio resource identity for scheduling the user equipment to the second base station; or the coordinating unit 61 may include:

a first sending subunit, configured to send, service quality information of a bearer of the user equipment to the second base station; and a first receiving subunit, configured to receive information of the coordinated radio resource that is determined by the second base station; or the coordinating unit 61 may include:

a second sending subunit, configured to send a coordinated radio resource or a radio resource identity for scheduling the user equipment to the second base station; and a second receiving subunit, configured to receive one or a combination of information of the coordinated radio resource that is determined by the second base station and a coordination result; or the coordinating unit 61 may include:

a third sending subunit, configured to send a coordinated radio resource or a radio resource identity of the user equipment and service quality information of a bearer of the user equipment to the second base station; and a third receiving subunit, configured to receive one or a combination of information of the coordinated radio resource that is determined by the second base station and a coordination result.

The coordinating unit 61 may further be configured to indicate, to the second base station, a duration of occupying a radio resource for scheduling the user equipment and/or coordinated effective time; or the coordinating unit 61 may further include:

an indicating subunit, configured to indicate, to the second base station, a duration of occupying a radio resource for scheduling the user equipment and/or coordinated effective time; and a time acquiring subunit, configured to acquire a schedulable duration and/or coordinated effective time of the coordinated radio resource according to a message returned by the second base station.

The coordinating unit 61 may further be configured to send, to the second base station, a cause value for identifying a cause of coordinating a radio resource.

The first base station provided in this embodiment of the present invention may further include: a switchover determining unit, configured to: before the coordinating unit coordinates a radio resource with the second base station, determine not to switch the user equipment corresponding to the user identity over to the second base station.

The switchover determining unit may be specifically configured to determine: according to a moving speed of the user equipment corresponding to the user identity or according to permission information, for a cell of the second base station, of the user equipment corresponding to the user identity or information that the second base station cannot be switched over to, not to switch the user equipment corresponding to the user identity over to the second base station.

The switchover determining unit is specifically configured to obtain the moving speed of the user equipment corresponding to the user identity according to historical information of the user equipment corresponding to the user identity.

The first base station provided in this embodiment of the present invention may further include: a resource release indicating unit, configured to send, to the second base station after the scheduling unit uses the coordinated radio resource to schedule the user equipment corresponding to the user identity, information indicating that the coordinated radio resource needs to be released.

The first base station provided in this embodiment of the present invention may further include: a switchover requesting unit and a switchover acknowledgment receiving unit.

The switchover requesting unit is configured to send a switchover request message to the second base station after the coordinating unit coordinates a radio resource with the second base station and before the scheduling unit uses the coordinated radio resource to schedule the user equipment corresponding to the user identity.

The switchover acknowledgment receiving unit is configured to receive a switchover request acknowledgment message returned by the second base station for the switchover request message.

Correspondingly, the scheduling unit is configured to use the coordinated radio resource to send a switchover command message to the user equipment corresponding to the user identity.

The coordinating unit 61 may be specifically configured to coordinate a radio resource with the second base station by using a switchover request message.

The switchover request message further carries a pre-switchover indication, where the pre-switchover indication is used to indicate, to the second base station, that a subsequent switchover message of the user equipment needs to be waited for.

The scheduling unit 62 may be specifically configured to use the coordinated radio resource to send the switchover command message to the user equipment corresponding to the user identity, or specifically configured to send a switchover cancellation message to the second base station, so as to indicate, to the second base station, that information of the coordinated radio resource needs to be released.

The first base station provided in this embodiment of the present invention may further include:

a switchover executing unit, configured to send the switchover command message to the user equipment after the coordinating unit coordinates a radio resource with the second base station; and a resource avoiding unit, configured to avoid using the coordinated radio resource.

The first base station provided in this embodiment of the present invention may further include:

a release indication receiving unit, configured to receive, after the resource avoiding unit avoids using the coordinated radio resource, information that is sent by the second base station to the serving base station and indicates that the coordinated radio resource needs to be released; and a releasing unit, configured to release the coordinated radio resource after the release indication receiving unit receives the information that is sent by the second base station to the serving base station and indicates that the coordinated radio resource needs to be released.

Alternatively, the first base station provided in this embodiment of the present invention may further include:

a releasing unit, configured to release the coordinated radio resource at a preset time.

In this embodiment, a first base station serving as a serving base station sends a user identity to an neighboring second base station through a coordinating unit and coordinates a radio resource with the second base station, so that a base station that is neighboring to a base station using the coordinated radio resource to schedule a user equipment corresponding to the user identity avoids using the coordinated radio resource. In this way, the coordinated radio resource is not simultaneously used by neighboring base stations or simultaneously used by neighboring base stations at relatively high power, thereby effectively reducing inter-cell signal interference.

Figure 7:
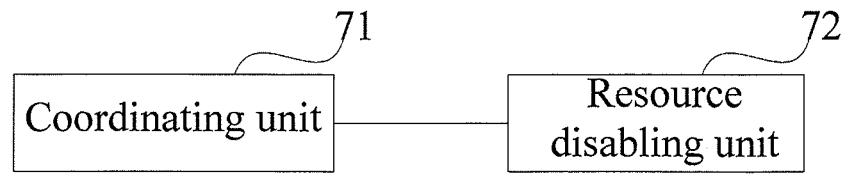
FIG. 7 is a schematic structural diagram of a second base station for reducing inter-cell signal interference according to an embodiment of the present invention.

FIG. 7 is a schematic structural diagram of a second base station for reducing inter-cell signal interference according to an embodiment of the present invention. As shown in FIG. 7, the second base station includes: a coordinating unit 71 and a resource disabling unit 72.

The coordinating unit 71 is configured to receive a user identity, sent by an neighboring serving base station, of a user equipment served by the serving base station, coordinate a radio resource with the serving base station, and obtain a coordinated radio resource for scheduling the user equipment corresponding to the user identity, so that the coordinated radio resource can be used for scheduling only the user equipment corresponding to the user identity.

The resource disabling unit 72 is configured to: when the serving base station uses the coordinated radio resource to schedule the user equipment corresponding to the user identity, avoid using the coordinated radio resource.

The coordinating unit 71 may be specifically configured to receive a coordinated radio resource or a radio resource identity for scheduling the user equipment sent by the serving base station; or may be specifically configured to receive service quality information of a bearer of the user equipment and a coordinated radio resource or a radio resource identity for scheduling the user equipment that are sent by the serving base station; or the coordinating unit 71 may include:

a first receiving subunit, configured to receive service quality information of a bearer of the user equipment sent by the serving base station; and a first sending subunit, configured to send information of the coordinated radio resource that is determined to the serving base station; or the coordinating unit 71 may include:

a second receiving subunit, configured to receive a coordinated radio resource or a radio resource identity of the user equipment sent by the serving base station; and a second sending subunit, configured to send one or a combination of information of the coordinated radio resource that is determined and a coordination result to the serving base station; or the coordinating unit 71 may include:

a third receiving subunit, configured to receive a coordinated radio resource or a radio resource identity of the user equipment and service quality information of a bearer of the user equipment that are sent by the serving base station; and a third sending subunit, configured to send one or a combination of information of the coordinated radio resource that is determined and a coordination result to the serving base station.

The coordinating unit 71 may further be configured to receive a duration of occupying a radio resource for scheduling the user equipment and/or coordinated effective time that are indicated by the serving base station; or the coordinating unit 71 may further include:

a time indication receiving subunit, configured to receive a duration of occupying a radio resource for scheduling the user equipment and/or coordinated effective time that are indicated by the serving base station; and a responding subunit, configured to return a message to the serving base station, so that the serving base station acquires a schedulable duration and/or coordinated effective time of the coordinated radio resource according to the returned message.

The coordinating unit 71 may further be configured to receive a cause value that is used for identifying a cause of coordinating a radio resource and sent by the serving base station.

The second base station provided in this embodiment of the present invention may further include:

a release indication receiving unit, configured to receive, after the resource disabling unit avoids using the coordinated radio resource, information that is sent by the serving base station and indicates that the coordinated radio resource needs to be released; and a releasing unit, configured to release the coordinated radio resource according to the information indicating that the coordinated radio resource needs to be released.

Alternatively, the second base station provided in this embodiment of the present invention may further include: a releasing unit, configured to automatically release the coordinated radio resource according to the schedulable duration of the coordinated radio resource.

The coordinating unit 71 may coordinate a radio resource with the serving base station by using a switchover request message and a switchover request acknowledgment message. The switchover request message may further carry a pre-switchover indication, where the pre-switchover indication is used to indicate, to the second base station, that a subsequent switchover message of the user equipment needs to be waited for.

The second base station provided in this embodiment of the present invention may further include: an access identifying unit, configured to identify after the resource disabling unit avoids using the coordinated radio resource, that the user equipment corresponding to the user identity accesses the second base station; and a scheduling unit, configured to use the coordinated radio resource to schedule the user equipment corresponding to the user identity.

The second base station provided in this embodiment of the present invention may further include:

a release indicating unit, configured to sends, to the serving base station after the coordinated radio resource is used to schedule the user equipment corresponding to the user identity, information indicating that the coordinated radio resource needs to be released, so that the serving base station releases the coordinated radio resource.

In this embodiment, a second base station receives, through a coordinating unit, a user identity sent by an neighboring first base station serving as a serving base station, and coordinates a radio resource with the first base station, so that a base station that is neighboring to a base station using the coordinated radio resource to schedule a user equipment corresponding to the user identity avoids using the coordinated radio resource. In this way, the coordinated radio resource is not simultaneously used by neighboring base stations or simultaneously used by neighboring base stations at relatively high power, thereby effectively reducing inter-cell signal interference.

Figure 8:
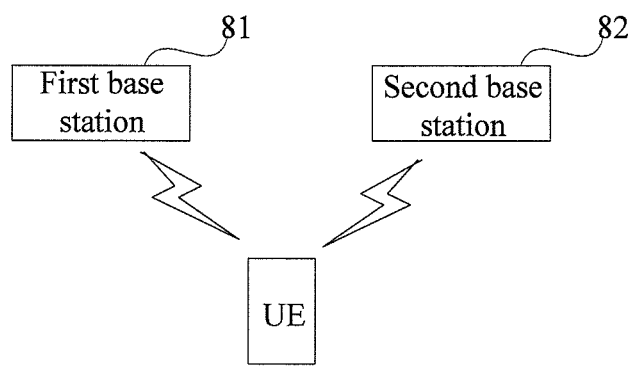
FIG. 8 is a schematic structural diagram of a radio communication system according to an embodiment of the present invention.

FIG. 8 is a schematic structural diagram of a radio communication system according to an embodiment of the present invention. As shown in FIG. 8, the radio communication system includes a first base station 81 and a second base station 82. When a certain user equipment is located in an overlapped area of cells of the first base station 81 and the second base station 82, the first base station 81 and the second base station 82 may coordinate a radio resource, so as to ensure that the coordinated radio resource is used for scheduling only the user equipment. For details, see the description in the foregoing method embodiments. The first base station 81 may be any first base station for reducing inter-cell signal interference provided in the foregoing base station embodiments, the second base station 82 may be any second base station for reducing inter-cell signal interference provided in the foregoing base station embodiments, and the first base station 81 is neighboring to the second base station 82.

In this embodiment, a first base station serving as a serving base station coordinates a radio resource with an neighboring second base station by sending a user identity to the second base station, so that a base station that is neighboring to a base station using the coordinated radio resource to schedule a user equipment corresponding to the user identity avoids using the coordinated radio resource. In this way, the coordinated radio resource is not simultaneously used by neighboring base stations or simultaneously used by neighboring base stations at relatively high power, thereby effectively reducing inter-cell signal interference.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for reducing inter-cell signal interference, the method comprising:
   sending, by a serving base station, a user identity of a served user equipment to a neighboring second base station;
   coordinating a radio resource with the second base station;
   obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;
   determining a moving speed of the user equipment corresponding to the user identity;
   sending information to the second base station indicating that the coordinated radio resource needs to be released by the second base station in response to the moving speed of the user equipment meeting a threshold value; and using, by the serving base station, the coordinated radio resource to schedule the user equipment corresponding to the user identity.

2. The method for reducing inter-cell signal interference according to claim 1, wherein coordinating a radio resource with the second base station comprises:

sending, by the serving base station, a coordinated radio resource or a radio resource identity for scheduling the user equipment to the second base station; or sending, by the serving base station, service quality information of a bearer of the user equipment and a coordinated radio resource or a radio resource identity for scheduling the user equipment to the second base station; or sending, by the serving base station, service quality information of a bearer of the user equipment to the second base station; and receiving, by the serving base station, information of the coordinated radio resource that is determined by the second base station; or sending, by the serving base station, a coordinated radio resource or a radio resource identity of the user equipment to the second base station; and receiving, by the serving base station, one or a combination of information of the coordinated radio resource that is determined by the second base station and a coordination result; or sending, by the serving base station, a coordinated radio resource or a radio resource identity of the user equipment and service quality information of a bearer of the user equipment to the second base station; and receiving, by the serving base station, one or a combination of information of the coordinated radio resource that is determined by the second base station and a coordination result.

3. The method for reducing inter-cell signal interference according to claim 2, wherein coordinating a radio resource with the second base station further comprises:

indicating, by the serving base station to the second base station, a duration of occupying a radio resource for scheduling the user equipment and/or coordinated effective time; or indicating, by the serving base station to the second base station, a duration of occupying a radio resource for scheduling the user equipment and/or coordinated effective time; and acquiring, by the serving base station, a schedulable duration and/or coordinated effective time of the coordinated radio resource according to a message returned by the second base station.

4. The method for reducing inter-cell signal interference according to claim 2, wherein coordinating a radio resource with the second base station further comprises:

sending, by the serving base station to the second base station, a cause value for identifying a cause of coordinating a radio resource.

5. The method for reducing inter-cell signal interference according to claim 1, wherein before coordinating a radio resource with the second base station, the method comprises:

determining not to switch the user equipment corresponding to the user identity over to the second base station.

6. The method for reducing inter-cell signal interference according to claim 5, wherein determining not to switch the user equipment corresponding to the user identity over to the second base station comprises:

determining, by the serving base station according to permission information, for a cell of the second base station, of the user equipment corresponding to the user identity or information that the second base station cannot be switched over to, not to switch the user equipment corresponding to the user identity over to the second base station.

7. The method for reducing inter-cell signal interference according to claim 1, wherein the moving speed of the user equipment corresponding to the user identity is obtained according to historical information of the user equipment corresponding to the user identity.

8. A method for reducing inter-cell signal interference, the method comprising:

sending, by a serving base station, a user identity of a served user equipment to a neighboring second base station;

coordinating a radio resource with the second base station;

obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;

using, by the serving base station, the coordinated radio resource to schedule the user equipment corresponding to the user identity; and wherein after using, by the serving base station, the coordinated radio resource to schedule the user equipment corresponding to the user identity, the method further comprises:

sending, to the second base station, information indicating that the coordinated radio resource needs to be released.

9. A method for reducing inter-cell signal interference, the method comprising:

sending, by a serving base station, a user identity of a served user equipment to a neighboring second base station;

coordinating a radio resource with the second base station;

obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;

using, by the serving base station, the coordinated radio resource to schedule the user equipment corresponding to the user identity;

wherein after coordinating a radio resource with the second base station, the method further comprises:

sending, by the serving base station, a switchover request message to the second base station, and receiving a switchover request acknowledgment message returned by the second base station for the switchover request message; and wherein using, by the serving base station, the coordinated radio resource to schedule the user equipment corresponding to the user identity comprises:

using, by the serving base station, the coordinated radio resource to send a switchover command message to the user equipment corresponding to the user identity.

10. The method for reducing inter-cell signal interference according to claim 1, wherein information sent by the serving base station to the second base station is carried by using a switchover request message, and information that is received by the serving base station and sent by the second base station is carried by using a switchover request acknowledgment message.

11. The method for reducing inter-cell signal interference according to claim 10, wherein the switchover request message further carries a pre-switchover indication, wherein the pre-switchover indication is used to indicate, to the second base station, that a subsequent switchover message of the user equipment needs to be waited for.

12. The method for reducing inter-cell signal interference according to claim 10, wherein using, by the serving base station, the coordinated radio resource to schedule the user equipment corresponding to the user identity comprises:
using, by the serving base station, the coordinated radio resource to send a switchover command message to the user equipment corresponding to the user identity; or
sending, by the serving base station, a switchover cancellation message to the second base station, so as to indicate, to the second base station, that information of the coordinated radio resource needs to be released.

13. A method for reducing inter-cell signal interference, the method comprising:
sending, by a serving base station, a user identity of a served user equipment to a neighboring second base station;
coordinating a radio resource with the second base station;
obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;
using, by the serving base station, the coordinated radio resource to schedule the user equipment corresponding to the user identity; and
wherein after coordinating a radio resource with the second base station, the method further comprises:
sending, by the serving base station, the switchover command message to the user equipment; and
avoiding, by the serving base station, using the coordinated radio resource.

14. The method for reducing inter-cell signal interference according to claim 13, wherein after avoiding, by the serving base station, using the coordinated radio resource, the method further comprises:
releasing, by the serving base station, the coordinated radio resource after receiving information that is sent by the second base station to the serving base station and indicates that the coordinated radio resource needs to be released; or releasing, by the serving base station, the coordinated radio resource at a preset time.

15. A method for reducing inter-cell signal interference, the method comprising:
receiving, by a second base station, a user identity, sent by a neighboring serving base station, of a user equipment served by the serving base station;
coordinating a radio resource with the serving base station;
obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;
when the serving base station uses the coordinated radio resource to schedule the user equipment corresponding to the user identity, avoiding, by the second base station, using the coordinated radio resource; and wherein after avoiding, by the second base station, using the coordinated radio resource, the method further comprises:
receiving information sent by the serving base station and indicating that the coordinated radio resource needs to be released, and
releasing, by the second base station, the coordinated radio resource according to the information indicating that the coordinated radio resource needs to be released.

16. The method for reducing inter-cell signal interference according to claim 15, wherein coordinating a radio resource with the serving base station comprises:
receiving, by the second base station, a coordinated radio resource or a radio resource identity for scheduling the user equipment sent by the serving base station; or
receiving, by the second base station, service quality information of a bearer of the user equipment and a coordinated radio resource or a radio resource identity for scheduling the user equipment that are sent by the serving base station; or
receiving, by the second base station, service quality information of a bearer of the user equipment sent by the serving base station; and sending, by the second base station, information of the coordinated radio resource that is determined to the serving base station; or
receiving, by the second base station, a coordinated radio resource or a radio resource identity of the user equipment sent by the serving base station; and sending, by the second base station, one or a combination of information of the coordinated radio resource that is determined and a coordination result to the serving base station; or
receiving, by the second base station, a coordinated radio resource or a radio resource identity of the user equipment and service quality information of a bearer of the user equipment that are sent by the serving base station; and sending, by the second base station, one or a combination of information of the coordinated radio resource that is determined and a coordination result to the serving base station.

17. The method for reducing inter-cell signal interference according to claim 16, wherein coordinating a radio resource with the serving base station further comprises:
receiving, by the second base station, a duration of occupying a radio resource for scheduling the user equipment and/or coordinated effective time that are indicated by the serving base station; or
receiving, by the second base station, a duration of occupying a radio resource for scheduling the user equipment and/or coordinated effective time that are indicated by the serving base station; and
returning, by the second base station, a message to the serving base station, so that the serving base station acquires a schedulable duration and/or coordinated effective time of the coordinated radio resource according to the returned message.

18. The method for reducing inter-cell signal interference according to claim 16, wherein coordinating a radio resource with the serving base station further comprises:
receiving, by the second base station, a cause value that is used for identifying a cause of coordinating a radio resource and sent by the serving base station.

19. The method for reducing inter-cell signal interference according to claim 15, the method further comprises:
automatically releasing, by the second base station, the coordinated radio resource according to the schedulable duration of the coordinated radio resource.

20. A method for reducing inter-cell signal interference, the method comprising:
receiving, by a second base station, a user identity, sent by a neighboring serving base station, of a user equipment served by the serving base station;
coordinating a radio resource with the serving base station;
obtaining a coordinated radio resource for scheduling the user equipment corresponding to the user identity, so that a base station that is neighboring to a base station using the coordinated radio resource to schedule the user equipment corresponding to the user identity avoids using the coordinated radio resource;
when the serving base station uses the coordinated radio resource to schedule the user equipment corresponding to the user identity, avoiding, by the second base station, using the coordinated radio resource; and
wherein information received by the second base station from the serving base station is carried by using a switchover request message, and information sent by the second base station to the serving base station is carried by using a switchover request acknowledgment message.

21. The method for reducing inter-cell signal interference according to claim 20, wherein the switchover request message further carries a pre-switchover indication, wherein the pre-switchover indication is used to indicate, to the second base station, that a subsequent switchover message of the user equipment needs to be waited for.

22. The method for reducing inter-cell signal interference according to claim 20, wherein after avoiding, by the second base station, using the coordinated radio resource, the method further comprises:
identifying, by the second base station, that the user equipment corresponding to the user identity accesses the second base station, and using the coordinated radio resource to schedule the user equipment corresponding to the user identity.

23. The method for reducing inter-cell signal interference according to claim 22, wherein after using the coordinated radio resource to schedule the user equipment corresponding to the user identity, the method further comprises:
sending, by the second base station to the serving base station, information indicating that the coordinated radio resource needs to be released, so that the serving base station releases the coordinated radio resource.

24. A first base station for reducing inter-cell signal interference, the first base station comprising:
a coordinating unit, configured to send a user identity of a served user equipment to a neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource; and
a scheduling unit, configured to use the coordinated radio resource to schedule the user equipment corresponding to the user identity, determine a moving speed of the user equipment corresponding to the user identity, and send information to the second base station indicating that the coordinated radio resource needs to be released by the second base station in response to the moving speed of the user equipment meeting a threshold value.

25. The base station according to claim 24, wherein:
the coordinating unit is configured to:
send a coordinated radio resource or a radio resource identity for scheduling the user equipment to the second base station; or
send, service quality information of a bearer of the user equipment and a coordinated radio resource or a radio resource identity for scheduling the user equipment to the second base station; or
the coordinating unit comprises:
a first sending subunit, configured to send, service quality information of a bearer of the user equipment to the second base station; and
a first receiving subunit, configured to receive information of the coordinated radio resource that is determined by the second base station; or
the coordinating unit comprises:
a second sending subunit, configured to send a coordinated radio resource or a radio resource identity of the user equipment to the second base station; and
a second receiving subunit, configured to receive one or a combination of information of the coordinated radio resource that is determined by the second base station and a coordination result; or
the coordinating unit comprises:
a third sending subunit, configured to send a coordinated radio resource or a radio resource identity of the user equipment and service quality information of a bearer of the user equipment to the second base station; and
a third receiving subunit, configured to receive one or a combination of information of the coordinated radio resource that is determined by the second base station and a coordination result.

26. The base station according to claim 25, wherein:
the coordinating unit is further configured to indicate, to the second base station, a duration of occupying a radio resource for scheduling the user equipment and/or coordinated effective time; or
the coordinating unit further comprises:
an indicating subunit, configured to indicate, to the second base station, a duration of occupying a radio resource for scheduling the user equipment and/or coordinated effective time; and
a time acquiring subunit, configured to acquire a schedulable duration and/or coordinated effective time of the coordinated radio resource according to a message returned by the second base station.

27. The base station according to claim 25, wherein the coordinating unit is further configured to send, to the second base station, a cause value for identifying a cause of coordinating a radio resource.

28. The base station according to claim 24, further comprising:
a switchover determining unit, configured to: before the coordinating unit coordinates a radio resource with the second base station, determine not to switch the user equipment corresponding to the user identity over to the second base station.

29. The base station according to claim 28, wherein the switchover determining unit is configured to determine, according to a moving speed of the user equipment corresponding to the user identity or according to permission information, for a cell of the second base station, of the user equipment corresponding to the user identity or information that the second base station cannot be switched over to, not to switch the user equipment corresponding to the user identity over to the second base station.

30. The base station according to claim 29, wherein the switchover determining unit is configured to obtain the moving speed of the user equipment corresponding to the user identity according to historical information of the user equipment corresponding to the user identity.

31. A first base station for reducing inter-cell signal interference, the first base station comprising:
   a coordinating unit, configured to send a user identity of a served user equipment to a neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource;
   a scheduling unit, configured to use the coordinated radio resource to schedule the user equipment corresponding to the user identity; and
   a resource release indicating unit, configured to send, to the second base station after the scheduling unit uses the coordinated radio resource to schedule the user equipment corresponding to the user identity, information indicating that the coordinated radio resource needs to be released.

32. A first base station for reducing inter-cell signal interference, the first base station comprising:
   a coordinating unit, configured to send a user identity of a served user equipment to a neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource;
   a scheduling unit, configured to use the coordinated radio resource to schedule the user equipment corresponding to the user identity;
   a switchover requesting unit, configured to send a switchover request message to the second base station after the coordinating unit coordinates a radio resource with the second base station and before the scheduling unit uses the coordinated radio resource to schedule the user equipment corresponding to the user identity; and
   a switchover acknowledgment receiving unit, configured to receive a switchover request acknowledgment message returned by the second base station for the switchover request message, wherein
   the scheduling unit is configured to send, by the coordinated radio resource, a switchover command message to the user equipment corresponding to the user identity.

33. The base station according to claim 24, wherein the coordinating unit is configured to coordinate a radio resource with the second base station by using a switchover request message.

34. The base station according to claim 33, wherein the switchover request message further carries a pre-switchover indication, wherein the pre-switchover indication is used to indicate, to the second base station, that a subsequent switchover message of the user equipment needs to be waited for.

35. A first base station for reducing inter-cell signal interference, the first base station comprising:
   a coordinating unit, configured to send a user identity of a served user equipment to a neighboring second base station, coordinate a radio resource with the second base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource;
   a scheduling unit, configured to use the coordinated radio resource to schedule the user equipment corresponding to the user identity; and
   wherein the scheduling unit is configured to use the coordinated radio resource to send a switchover command message to the user equipment corresponding to the user identity, or configured to send a switchover cancellation message to the second base station, so as to indicate, to the second base station, that information of the coordinated radio resource needs to be released.

36. The base station according to claim 35, further comprising:
   a switchover executing unit, configured to send the switchover command message to the user equipment after the coordinating unit coordinates a radio resource with the second base station; and
   a resource avoiding unit, further configured to avoid using the coordinated radio resource.

37. The base station according to claim 36, wherein:
   the base station further comprises:
      a release indication receiving unit, configured to receive, after the resource avoiding unit avoids using the coordinated radio resource, information that is sent by the second base station to the serving base station and indicates that the coordinated radio resource needs to be released; and
      a releasing unit, configured to release the coordinated radio resource after the release indication receiving unit receives the information that is sent by the second base station to the serving base station and indicates that the coordinated radio resource needs to be released; or
   the base station further comprises:
      a releasing unit, configured to release the coordinated radio resource at a preset time.

38. A second base station for reducing inter-cell signal interference, the second base station comprising:
   a coordinating unit, configured to receive a user identity, sent by a neighboring serving base station, of a user equipment served by the serving base station, coordinate a radio resource with the serving base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource;
   a resource disabling unit, configured to: when the serving base station uses the coordinated radio resource to schedule the user equipment corresponding to the user identity, avoid using the coordinated radio resource;
   a release indication receiving unit, configured to receive, after the resource disabling unit avoids using the coordinated radio resource, information that is sent by the serving base station and indicates that the coordinated radio resource needs to be released; and a releasing unit, configured to release the coordinated radio resource according to the information indicating that the coordinated radio resource needs to be released.

39. The base station according to claim 38, wherein:
the coordinating unit is configured to:
  receive a coordinated radio resource or a radio resource identity for scheduling the user equipment sent by the serving base station; or
  receive service quality information of a bearer of the user equipment and a coordinated radio resource or a radio resource identity for scheduling the user equipment that are sent by the serving base station; or
the coordinating unit comprises:
  a first receiving subunit, configured to receive service quality information of a bearer of the user equipment sent by the serving base station; and
  a first sending subunit, configured to send information of the coordinated radio resource that is determined to the serving base station; or
the coordinating unit comprises:
  a second receiving subunit, configured to receive a coordinated radio resource or a radio resource identity of the user equipment sent by the serving base station; and
  a second sending subunit, configured to send one or a combination of information of the coordinated radio resource that is determined and a coordination result to the serving base station; or
the coordinating unit comprises:
  a third receiving subunit, configured to receive a coordinated radio resource or a radio resource identity of the user equipment and service quality information of a bearer of the user equipment that are sent by the serving base station; and
  a third sending subunit, configured to send one or a combination of information of the coordinated radio resource that is determined and a coordination result to the serving base station.

40. The base station according to claim 39, wherein:
the coordinating unit is further configured to receive a duration of occupying a radio resource for scheduling the user equipment and/or coordinated effective time that are indicated by the serving base station; or
the coordinating unit further comprises:
  a time indication receiving subunit, configured to receive a duration of occupying a radio resource for scheduling the user equipment and/or coordinated effective time that are indicated by the serving base station; and
  a responding subunit, configured to return a message to the serving base station, so that the serving base station acquires a schedulable duration and/or coordinated effective time of the coordinated radio resource according to the returned message.

41. The base station according to claim 39, wherein the coordinating unit is further configured to receive a cause value that is used for identifying a cause of coordinating a radio resource and sent by the serving base station.

42. The base station according to claim 38, wherein:
the releasing unit is configured to automatically release the coordinated radio resource according to the schedulable duration of the coordinated radio resource.

43. A second base station for reducing inter-cell signal interference, the second base station comprising:
  a coordinating unit, configured to receive a user identity, sent by a neighboring serving base station, of a user equipment served by the serving base station, coordinate a radio resource with the serving base station, and obtain a coordinated radio resource for scheduling the user equipment corresponding to the user identity, so that a base station that is neighboring to a base station using the coordinated radio resource to schedule the user equipment corresponding to the user identity avoids using the coordinated radio resource;
  a resource disabling unit, configured to: when the serving base station uses the coordinated radio resource to schedule the user equipment corresponding to the user identity, avoid using the coordinated radio resource; and
  wherein the coordinating unit coordinates the radio resource with the serving base station by using a switchover request message and a switchover request acknowledgment message.

44. The base station according to claim 43, wherein the switchover request message further carries a pre-switchover indication, wherein the pre-switchover indication is used to indicate, to the second base station, that a subsequent switchover message of the user equipment needs to be waited for.

45. The base station according to claim 43, further comprising:
  an access identifying unit, configured to identify, by the second base station after the resource disabling unit avoids using the coordinated radio resource, that the user equipment corresponding to the user identity accesses the second base station; and
  a scheduling unit, configured to use the coordinated radio resource to schedule the user equipment corresponding to the user identity.

46. The base station according to claim 45, further comprising:
  a release indicating unit, configured to send, to the serving base station after the coordinated radio resource is used to schedule the user equipment corresponding to the user identity, information indicating that the coordinated radio resource needs to be released, so that the serving base station releases the coordinated radio resource.

* * * * *